(12) United States Patent
Rodriguez (10) Patent No.: US 8,369,113 B2
(45) Date of Patent: Feb. 5, 2013

(54) POWER CONDITIONING UNIT (75) Inventor: Cuauhtemoc Rodriguez, Impington (GB)

(73) Assignee: Enecsys Limited, Cambridge (GB)

( * ) Notice: Subject to any disclaimer, the term of this patent is extended or adjusted under 35 U.S.C. 154(b) by 772 days.

(21) Appl. No.: 11/718,879

(22) PCT Filed: Nov. 4, 2005

(86) PCT No.: PCT/GB2005/050197
§ 371 (c)(1),
(2), (4) Date: May 21, 2009

(87) PCT Pub. No.: WO2006/048688
PCT Pub. Date: May 11, 2006

(65) Prior Publication Data
US 2011/0205766 A1    Aug. 25, 2011

(30) Foreign Application Priority Data
Nov. 8, 2004    (GB) .................................. 0424556.9

(51) Int. Cl.
*H02M 5/458*    (2006.01)
*H02M 7/5387*    (2007.01)
(52) U.S. Cl. ........................................ 363/37; 363/132
(58) Field of Classification Search ............ 363/24–26, 363/21.12–21.18, 21.04–21.1, 37, 131, 132, 363/134
See application file for complete search history.

(56) References Cited

U.S. PATENT DOCUMENTS

| 2,852,721 | A |   | 9/1958 | Harders et al. |
| 4,479,175 | A |   | 10/1984 | Gille et al. |
| 4,626,983 | A |   | 12/1986 | Harada et al. |
| 4,772,994 | A |   | 9/1988 | Harada et al. |
| 5,329,222 | A |   | 7/1994 | Gyugyi et al. |
| 5,379,209 | A | * | 1/1995 | Goff .............................. 363/132 |

(Continued)

FOREIGN PATENT DOCUMENTS

| DE | 19732218 | 3/1999 |
| DE | 19937410 | 2/2001 |

(Continued)

OTHER PUBLICATIONS

Calais, et al.: "Inverters for Single-Phase Grid Connected Photovoltaic Systems—Overview and Prospects"; 17$^{th}$ E.C. Photovoltaic Solar Energy Conference, Munich, Germany, Oct. 22-26, 2001; Proceedings of the International Photovoltaic Solar Energy Conference, Munich: WIP-Renewable Energies, DE, vol. 1 of 3, Conf. 17, Oct. 22, 2001, pp. 437-440, XP001139459, ISBN: 3-936338-08-6; *Abstract, Fig. 2* .

(Continued)

*Primary Examiner* — Adolf Berhane
*Assistant Examiner* — Emily Pham
(74) *Attorney, Agent, or Firm* — Adeli & Tollen, LLP (57) ABSTRACT

A power conditioning unit for delivering power from a power source to a mains utility supply, the power conditioning unit comprising a plurality of input terminals for connecting to the power source, a plurality of output terminals for connecting to the mains utility supply, a voltage increasing converter connected to the input terminals, a voltage reducing converter connected to the voltage increasing converter and a dc-to-ac converter connected to the voltage reducing converter and to the output terminals.

15 Claims, 4 Drawing Sheets

U.S. PATENT DOCUMENTS

| | | |
|---|---|---|
| 5,381,327 A | 1/1995 | Yan |
| 5,404,059 A | 4/1995 | Löffler |
| 5,504,449 A | 4/1996 | Prentice |
| 5,576,941 A * | 11/1996 | Nguyen et al. ............ 363/21.07 |
| 5,585,749 A | 12/1996 | Pace et al. |
| 5,814,970 A | 9/1998 | Schmidt |
| 5,898,585 A | 4/1999 | Sirichote et al. |
| 5,930,131 A | 7/1999 | Feng |
| 6,021,052 A | 2/2000 | Unger et al. |
| 6,058,035 A | 5/2000 | Madenokouji et al. |
| 6,081,104 A | 6/2000 | Kern |
| 6,339,538 B1 | 1/2002 | Handleman |
| 6,369,461 B1 | 4/2002 | Jungreis et al. |
| 6,445,599 B1 | 9/2002 | Nguyen |
| 6,657,419 B2 | 12/2003 | Renyolds |
| 6,678,174 B2 | 1/2004 | Suzui et al. |
| 6,856,102 B1 * | 2/2005 | Lin et al. ...................... 315/291 |
| 6,888,728 B2 | 5/2005 | Takagi et al. |
| 6,950,323 B2 | 9/2005 | Achleitner et al. |
| 6,980,783 B2 * | 12/2005 | Liu et al. ...................... 455/296 |
| 7,031,176 B2 | 4/2006 | Kotsopoulos et al. |
| 7,064,967 B2 | 6/2006 | Ichinose et al. |
| 7,078,883 B2 | 7/2006 | Chapman et al. |
| 7,099,169 B2 * | 8/2006 | West et al. ................... 363/132 |
| 7,193,872 B2 | 3/2007 | Siri |
| 7,262,979 B2 | 8/2007 | Wai et al. |
| 7,319,313 B2 | 1/2008 | Dickerson et al. |
| 7,324,361 B2 | 1/2008 | Siri |
| 7,339,287 B2 | 3/2008 | Jepsen et al. |
| 7,414,870 B2 | 8/2008 | Röttger et al. |
| 7,450,401 B2 | 11/2008 | Iida |
| 7,463,500 B2 | 12/2008 | West |
| 7,466,566 B2 | 12/2008 | Fukumoto |
| 7,479,774 B2 | 1/2009 | Wai et al. |
| 7,885,085 B2 | 2/2011 | Orr et al. |
| 2002/0034083 A1 | 3/2002 | Ayyanar et al. |
| 2002/0085397 A1 | 7/2002 | Suzui et al. |
| 2002/0149950 A1 | 10/2002 | Takebayashi |
| 2003/0038615 A1* | 2/2003 | Elbanhawy ................... 323/282 |
| 2003/0080741 A1 | 5/2003 | LeRow et al. |
| 2003/0193821 A1 | 10/2003 | Krieger et al. |
| 2004/0076028 A1 | 4/2004 | Achleitner et al. |
| 2004/0165408 A1 | 8/2004 | West et al. |
| 2004/0207366 A1 | 10/2004 | Sung |
| 2004/0233685 A1 | 11/2004 | Matsuo et al. |
| 2005/0030772 A1 | 2/2005 | Phadke |
| 2005/0242795 A1 | 11/2005 | Al-Kuran et al. |
| 2006/0232220 A1 | 10/2006 | Melis |
| 2007/0035975 A1 | 2/2007 | Dickerson et al. |
| 2007/0290656 A1 | 12/2007 | Lee Tai Keung |
| 2008/0055941 A1 | 3/2008 | Victor et al. |
| 2008/0164766 A1 | 7/2008 | Adest et al. |
| 2008/0205096 A1 | 8/2008 | Lai et al. |
| 2008/0266919 A1 | 10/2008 | Mallwitz |
| 2008/0285317 A1 | 11/2008 | Rotzoll |
| 2008/0291707 A1 | 11/2008 | Fang |
| 2008/0304296 A1 | 12/2008 | NadimpalliRaju et al. |
| 2008/0304298 A1 | 12/2008 | Toba et al. |
| 2009/0097283 A1 | 4/2009 | Krein et al. |
| 2010/0195361 A1 | 8/2010 | Stem |
| 2010/0207455 A1 | 8/2010 | Erickson, Jr. et al. |
| 2011/0273015 A1 | 11/2011 | Adest et al. |

FOREIGN PATENT DOCUMENTS

| | | |
|---|---|---|
| DE | 10064039 | 12/2001 |
| EP | 0628901 | 12/1994 |
| EP | 0780750 | 6/1997 |
| EP | 0947905 | 10/1999 |
| EP | 1235339 | 8/2002 |
| EP | 1239576 | 9/2002 |
| GB | 1571681 | 7/1980 |
| GB | 2415841 | 1/2006 |
| JP | 01311874 | 12/1989 |
| JP | 05003678 | 1/1993 |
| JP | 07028538 | 1/1995 |
| JP | 08227324 | 9/1996 |
| JP | 08317664 | 11/1996 |
| JP | 10174452 | 6/1998 |
| JP | 2000020150 | 1/2000 |
| JP | 2000316282 | 11/2000 |
| JP | 2000324852 | 11/2000 |
| JP | 2003289674 | 10/2003 |
| WO | WO 2004/100348 | 11/2004 |
| WO | WO 2006/048688 | 5/2006 |
| WO | 2007/124518 | 11/2007 |
| WO | 2009/134756 | 11/2009 |

OTHER PUBLICATIONS

Kikuchi, et al.: "Single Phase Amplitude Modulation Inverter for Utility Interaction Photovoltaic System"; Industrial Electronics Society, 1999. IECON '99 Proceedings. The 25th Annual Conference of the IEEE San Jose, CA, USA Nov. 29-Dec. 3, 1999, Piscataway, NJ, USA; IEEE vol. 1, Nov. 29, 1999, pp. 385-389, XP010366885, ISBN: 0-7803-5735-3; *Fig. 1*.

Marra, et al.: "Self-Excited Induction Generator Controlled by a VS-PWM Converter Providing High Power-Factor Current to a Single-Phase Grid"; Industrial Electronics Society, 1998. IECON '98. Proceedings of the 24th Annual Conference of the IEEE Aachen, Germany Aug. 31-Sep. 4, 1998, New York, NY, USA, IEEE, vol. 2, Aug. 31, 1998, pp. 703-708, XP010308012, ISBM: 0-7803-4503-7; *Abstract, Fig. 1, p. 704, right-hand col.*.

Nonaka, et al.: "Interconnection System with Single Phase IGBT PWM CSI Between Photovoltaic Arrays and the Utility Line"; Conference Record of the Industry Applications Society Annual Meeting, Seattle, Oct. 7-12, 1990, New York, IEEE, US, vol. 2 Meeting 25, Oct. 7, 1990, pp. 1302-1307, XP010034871, ISBN: 0-87942-553-9; *Fig. 1*.

Rodriguez, et al.: "Dynamic Stability of Grid-Connected Photovoltaic Systems"; Power Engineering Society General Meeting, 2004. IEEE Denver, CO, USA, Jun. 6-10, 2004, Piscataway, NJ, USA, IEEE, Jun. 6, 2004, pp. 2194-2200, XP010756336, ISBN: 0-7803-8465-2; *Fig. 1*.

International Search Report for corresponding PCT/GB2005/050197, completed Dec. 20, 2005 by K-R Zettler of the EPO.

Martins, et al.: "Interconnection of a Photovoltaic Panels Array to a Single-Phase Utility Line from a Static Conversion System"; Power Electronics Specialists Conference, 2000, PESC 00. 2000 IEEE 31st Annual, ISSN: 0275-9306, p. 1207-1211 vol. 3.

Kotsopoulos, et al.: "Predictive DC Voltage Control of Single-Phase PV Inverters with Small DC Link Capacitance", IEEE Intn'l Symposium 2003, pp. 793-797.

Written Opinion of PCT/GB2005/050197, Feb. 14, 2006 (mailing date), Enecsys Limited.

International Preliminary Report on Patentability of PCT/GB2005/050197, May 8, 2007 (issuance date), Enecsys Limited.

Author Unknown, "DC Combiner Box Enables Better Awareness for Active Management," SolarMagic DC Monitoring Combiner Box Specifications, Apr. 2011, 2 pages, National Semiconductor Corporation.

Author Unknown, "SolarMagic power optimizer; Integrated Smart Panel Chipset Maximizes PV System Efficiency at the Lowest Cost per kWh," SM3320-1A1 Power Optimizer Specifications, Sep. 2010, 2 pages, National Semiconductor Corporation.

Calais, Martina, et al., "Inverters for Single-Phase Grid Connected Photovoltaic Systems—An Overview," IEEE Power Electronics Specialists Conferences, Jun. 23-27, 2002, pp. 1995-2000, vol. 4, IEEE.

Kjaer, Soeren Baekhoej, et al., "Design Optimization of a Single Phase Inverter for Photovoltaic Applications," IEEE 34th Annual Power Electronics Specialist Conference, Jun. 15-19, 2003, pp. 1183-1190, vol. 3, IEEE.

Krein, Philip T., et al., "Cost-Effective Hundred Year Life for Single-Phase Inverters and Rectifiers in Solar and LED Lighting Applications Based on Minimum Capacitance Requirements and a Ripple Power Port," Applied Power Electronics Conference and Exposition, Feb. 15-19, 2009, pp. 620-625.

Shimizu, Toshihisa, et al., "A Flyback-type Single Phase Utility Interactive Inverter with Low-frequency Ripple Current Reduction on the DC Input for an AC Photovoltaic Module System," IEEE 33rd

Annual Power Electronics Specialist Conference, Month Unknown, 2002, pp. 1483-1488, vol. 3, IEEE.

Xiaofeng, Sun, et al., "A Research on Photovoltaic Energy Controlling System with Maximum Power Point Tracking," Proceedings of the Power Conversion Conference-Osaka, Apr. 2-5, 2002, pp. 822-826, vol. 2, IEEE.

Yatsuki, Satoshi, et al., "A Novel AC Photovoltaic Module System based on the Impedance-Admittance Conversion Theory," IEEE $32^{nd}$ Annual Power Electronics Specialists Conference, Month Unknown, 2001, pp. 2191-2196, vol. 4, IEEE.

* cited by examiner

POWER CONDITIONING UNIT

CLAIM OF BENEFIT TO PRIOR APPLICATIONS

This application is a national stage application of PCT Application PCT/GB2005/050197, entitled "Power Conditioning Unit," filed on Nov. 4, 2005 now published as International Publication WO 2006/048688. PCT Application PCT/GB2005/050197 claims the benefit of United Kingdom Patent Application GB 0424556.9, filed Nov. 8, 2004.

The present invention relates to a power conditioning unit, in particular a power conditioning unit for low-power grid-connected applications.

Power converters for photovoltaic modules in the range of 100-300 W have been reported over the past 10 years. For example, "Design optimisation of a single phase inverter for photovoltaic applications" (S. B. Kjaer, F. Blaabjerg, IEEE Power Electronics Specialist Conference, Vol. 3, pp. 1183-1190, June 2003), "A flyback-type single phase utility interactive inverter with low-frequency ripple current reduction on the DC input for an AC photovoltaic module system" (T. Shimizu, K. Wada, N. Nakamura, IEEE Power Electronics Specialist Conference, Vol. 3, pp. 1483-1488, June 2002), "Inverters for single-phase grid connected photovoltaic systems—An overview" (M. Calais, J. Myrzik, T. Spooner, V. G. Agelidis, IEEE Power Electronics Specialist Conference, Vol. 4, pp. 23-27, June 2002) and "A novel ac photovoltaic module system based on the impedance-admittance conversion theory" (S. Yatsuki, K. Wada, T. Shimizu, H. Takagi, M. Ito, IEEE Power Electronics Specialist Conference, Vol. 4, pp. 17-21, June 2001).

A wide range of power electronics topologies are suggested in the literature and some are readily available in the market or patented. EP0780750, JP10174452, US5898585, DE19732218, EP0947905, JP2000020150, JP2000324852 and JP2003289674 are examples. However, it has been observed that the performance offered by such devices is far from optimal. In some instances the lifetime of the PCU is too short compared to the lifetime of the PV panel, in other cases the cost is excessive, and in others the efficiency is low. It is also reported that there is a compromise among these three factors. The PCU we describe offers a low-cost solution while maintaining a relatively high efficiency and reliability. The system overall cost is reduced by introducing a simple control of the current injection into the grid that uses generic logic gates and operational amplifiers.

According to a first aspect of the present invention there is therefore provided a power conditioning unit for delivering power from a power source to a mains utility supply, the power conditioning unit comprising: a plurality of input terminals for connecting to the power source; a plurality of output terminals for connecting to the mains utility supply; a voltage increasing converter connected to the input terminals; a voltage reducing converter connected to the voltage increasing converter; and a dc-to-ac converter connected to the voltage reducing converter and to the output terminals.

This can provide reduced power losses in the power conditioning unit compared with conventional units utilising PWM control in the inverter transistors. In conventional units, switching losses occur in each inverter transistor, whereas in the examples we will describe, one power control transistor operates in switched mode (e.g. at high frequencies up to 500 kHz), the main inverter transistors being either fully on or fully off and switching only at line rate (e.g. 50 Hz or 60 Hz).

The voltage reducing converter and the dc-to-ac converter may share an inductor, where the inductor is connected at the output of the voltage reducing converter and at the input of the dc-to-ac converter and is configured to function as an energy storage device in the voltage reducing converter and as a current smoothing device in the dc-to-ac converter. Preferably the voltage reducing converter comprises a buck converter and the dc-to-ac converter comprises a current mode inverter.

The dc-to-ac converter may incorporate protection diodes connected in series with the transistors in the inverter, so that the protection diodes prevent current flowing in the reverse direction through the body diode of the transistors. This is to prevent current flowing during the switching transitions, when one of the two transistors in a switching pair (e.g. $Q_1$ and $Q_4$ or alternatively $Q_2$ and $Q_3$ in FIG. 1) switches on or turns off faster than the other. Without the protection diodes being present a current may flow from one of the ac power connections through the transistor which is turned on and back through the body diode of the complementary transistor in the other pair. Incorporating the protection diodes may increase the lifetime of the converter by eliminating current spikes in the transistors.

According to a second aspect of the present invention there is provided a method of controlling a power conditioning unit, the power conditioning unit comprising a plurality of input terminals for connecting to a dc power source, a voltage increasing converter connected to the input terminals, a voltage reducing converter connected to the voltage increasing converter, a dc to ac converter connected to the voltage reducing converter and a plurality of output terminals for connecting to a mains utility supply, the output terminals being connected to the dc to ac converter, the method comprising: sensing a voltage on the output terminals; generating a reference current responsive to said sensing; measuring a supply current in the dc to ac converter; and controlling the voltage reducing converter responsive to a difference between the reference current and the supply current to thereby control the power injected into the mains utility supply.

The reference current generated may be a full wave rectified sinusoid current. This allows the power conditioning unit to supply power to the grid as a sinusoidal current, regardless of any distortion in the grid waveform itself. Alternatively, the reference current may be generated to compensate for distortion in the grid voltage waveform, thereby reducing grid waveform distortion for other devices connected to the grid.

The controlling of the voltage reducing converter may involve turning a power control switch in the voltage reducing converter off if the supply current is greater than the reference current and turning the switch on if the supply current is less than the reference current. The power control switch may be controlled in synchronisation with the generation of the reference current, particularly if the reference current is generated using a digital to analogue converter and a look up table. This has the advantage of reduced component count compared with using separate clock sources for the power control and the reference current generation, and also reduces distortion in the current waveform.

According to a third aspect of the present invention there is provided a power conditioning unit for delivering power from a power source to a mains utility supply the power conditioning unit comprising: input connection means for connecting to the power source; output connection means for connecting to the mains utility supply; voltage increasing means for increasing the voltage supplied to the input connection means; voltage reducing means for reducing the voltage supplied by the voltage increasing means; dc to ac conversion means for converting a direct current supplied by the voltage reducing means to an alternating current suitable for supplying to the mains utility supply; voltage sensing means for sensing a voltage on the output connection means; reference current generation means for generating a reference current responsive to said sensing; current measuring means for measuring a supply current in the dc to ac conversion means; and control means for controlling the voltage reducing means responsive to a difference between the reference current and the supply current.

According to a fourth aspect of the present invention there is provided a power conditioning unit comprising a dc to dc converter and a dc to ac converter, wherein the dc to dc converter and the dc to ac converter share an inductor and wherein the inductor is configured to function as an energy storage inductor in the dc to dc converter and as a current smoothing inductor in the dc to ac converter.

According to a fifth aspect of the present invention there is provided a power conditioning unit incorporating a dc to ac converter; a plurality of transitions connected to the dc connection; a plurality of protection diodes connected in series with the transistors; and an ac connection connected to the diodes, where the protection diodes prevent current flow in the transistors in the reverse direction thereby increasing the device lifetime of said transistors.

According to a sixth aspect of the present invention there is provided a method of increasing device lifetime in a power conditioning unit, the power conditioning unit having a plurality of transistors, the method comprising: providing a plurality of protection diodes in series with the transistors.

The above described features and aspects of the invention may be utilised separately or combined in any permutation. Furthermore, they are not limited to single-phase applications but may be applied to three-phase applications separately or combined in any permutation.

These and other aspects of the present invention will now be further described, by way of example only, with reference to the accompanying drawings in which.

Broadly speaking we will now describe a power conditioning unit (PCU) to inject power from a photovoltaic panel or a fuel cell into the grid in a safe, efficient, and reliable manner. A single-phase low-power converter is presented hereby that features a simple control that can be implemented with inexpensive logic gates and op-amps. A basic microcontroller is used to measure environment variables such as voltages, currents, and temperature in order to comply with standards, and to coordinate the connection with the grid. The PCU topology includes a generic dc-ac-dc that provides voltage amplification and isolation, as it is required in some regulations and a current source inverter (CSI) connected to the mains. The current injection is regulated using current-mode-control in the inductor of the CSI via an intermediate buck-type stage.

Three conversion stages are utilised in the system. First, the dc-link voltage is maintained above the grid voltage magnitude via a dc-ac-dc converter with isolation transformer. This stage is controlled in open loop and hence the voltage appearing at the dc-link is that of the source amplified by the turns ratio of the transformer. Various generic topologies can be used for this purpose and therefore this block is considered here only as a voltage amplifier.

Two additional conversion stages control the current injection into the grid: a buck circuit featuring current-mode-control (CMC) in conjunction with a current source inverter (CSI) switching at 50 Hz in synchronism with the grid as will be explained.

Figure 1:
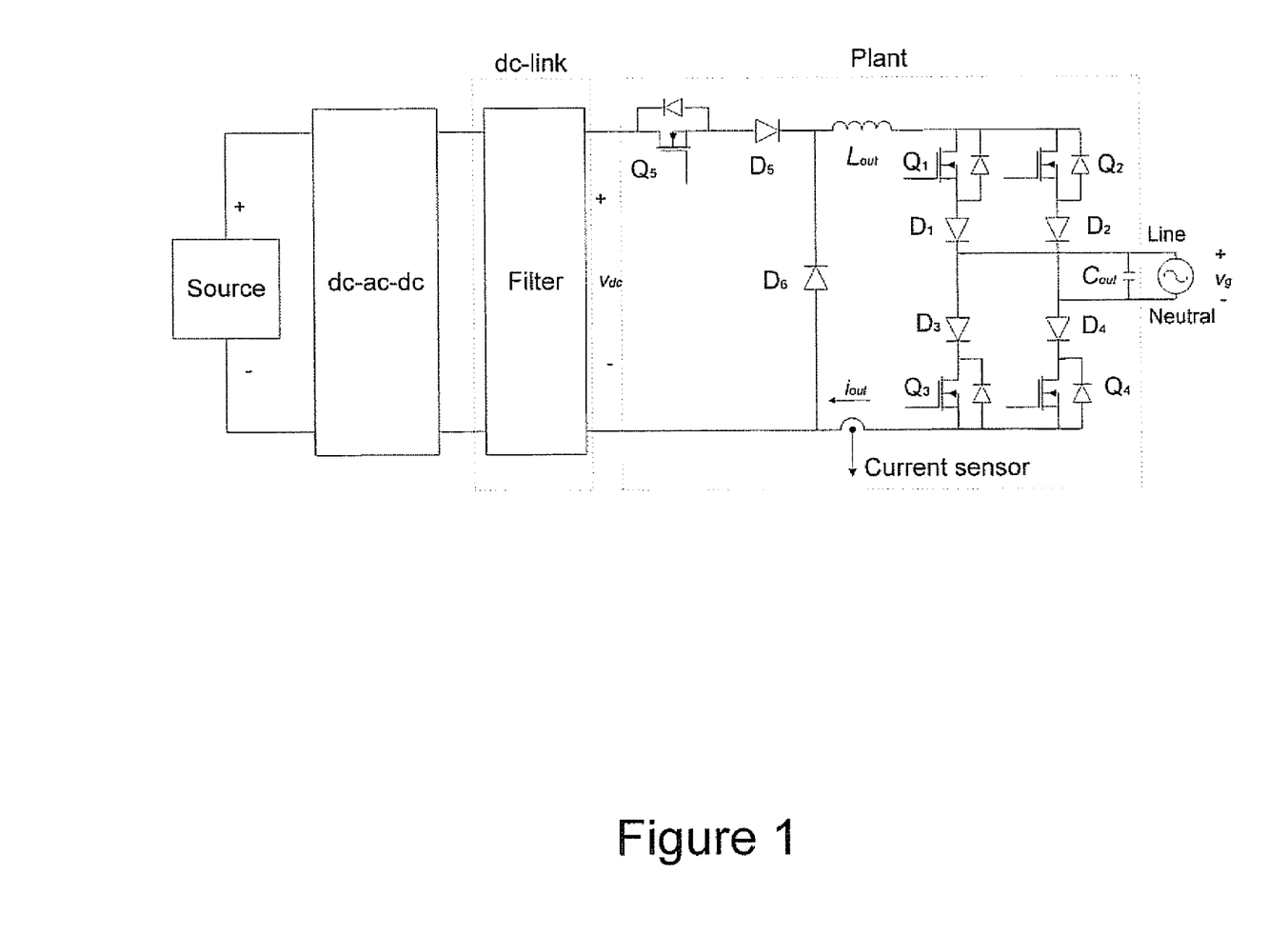
FIG. 1 shows a power conditioning unit for single-phase grid-connected distributed resources.

A power conditioning unit for single-phase grid-connected distributed resources is shown in FIG. 1. It comprises a generic dc-ac-dc converter that steps up or amplifies the voltage of the source to a voltage level above the grid voltage magnitude. Among the many possibilities of such a converter are: Full-bridge inverter and full-bridge rectifier, push-pull converter, flyback converter, feed-forward converter, resonant converter with transformer. The output of this converter is connected to a filter that prevents the flow of high frequency components in current and voltage. The input and output of this filter form what is called dc-link as depicted in FIG. 1.

We will describe the operation of transistors $Q_1$ to $Q_5$, diodes $D_1$ to $D_6$, inductor $L_{out}$, capacitor $C_{out}$, and the current sensor. The grid voltage terminals from the residential outlet, line and neutral, are connected in parallel with capacitor $C_{out}$. The line terminal is connected at the node between diodes $D_1$ and $D_3$, and the neutral terminal is connected at the node between diodes $D_2$ and $D_4$.

Transistors $Q_1$ and $Q_4$ are switched on during the positive half cycle of the grid voltage waveform and $Q_2$ and $Q_3$ during the negative half cycle. Diodes $D_1$-$D_4$ prevent a short circuit in the grid due to glitches in the transistor drivers that might result in destruction of the converter. During the transition between one half cycle and the other, it is impossible for the transistors in each pair ($Q_1$ and $Q_4$, $Q_2$ and $Q_3$) to change state at exactly the same time. If for example, $Q_1$ and $Q_4$ are switched off and $Q_3$ is switched on but $Q_2$ has not yet been switched on, a current may flow from the line grid terminal through $Q_3$ and back through the body diode of $Q_4$ to the neutral grid terminal. More generally, if at any time one of the transistors in a pair is on and the other oft such a current may flow. Adding diodes $D_1$-$D_4$ prevents grid currents flowing through the body diodes, hence prolonging the lifespan of the converter. Although these diodes reduce the overall efficiency of the converter they improve the reliability since they protect the transistors.

$D_6$ acts as a free-wheeling diode and $D_5$ prevents current form flowing back into the dc-link. When transistor $Q_5$ is switched on, a current builds up through $L_{out}$. When $Q_5$ is switched off, this current cannot return to zero immediately so $D_6$ provides an alternative path for current to flow from the negative supply rail. Because of the body diode in $Q_5$, it might be possible for a current to flow back into the dc-link when $Q_5$ is switched off; $D_5$ prevents this happening.

Finally, the current injection into the grid is controlled using transistor $Q_5$. When $Q_5$ is turned on the current flowing through $L_{out}$ increases and decreases when it is turned off thus achieving current-mode-control. This is always true as long as the dc-link voltage is maintained higher than the grid voltage magnitude. Hence the current is forced to follow a rectified sinusoid which is in turn unfolded by the full-bridge output (transistors $Q_1$ to $Q_4$).

The information from the current sensor is used to feedback the instantaneous current value to the control circuits. As mentioned previously the current injection is controlled using CMC. The inductor current, $i_{out}$, is compared to a reference current, $i_{ref}$, to decide whether or not to switch on transistor $Q_5$. If the reference current is higher than $i_{out}$, then the transistor is turned on. It is switched off otherwise. The decision is buffered and stored using a D flip-flop with a clock signal (CLK) in the range of 100 kHz to 500 kHz. The control block diagram is shown in FIG. 2.

Figure 2:
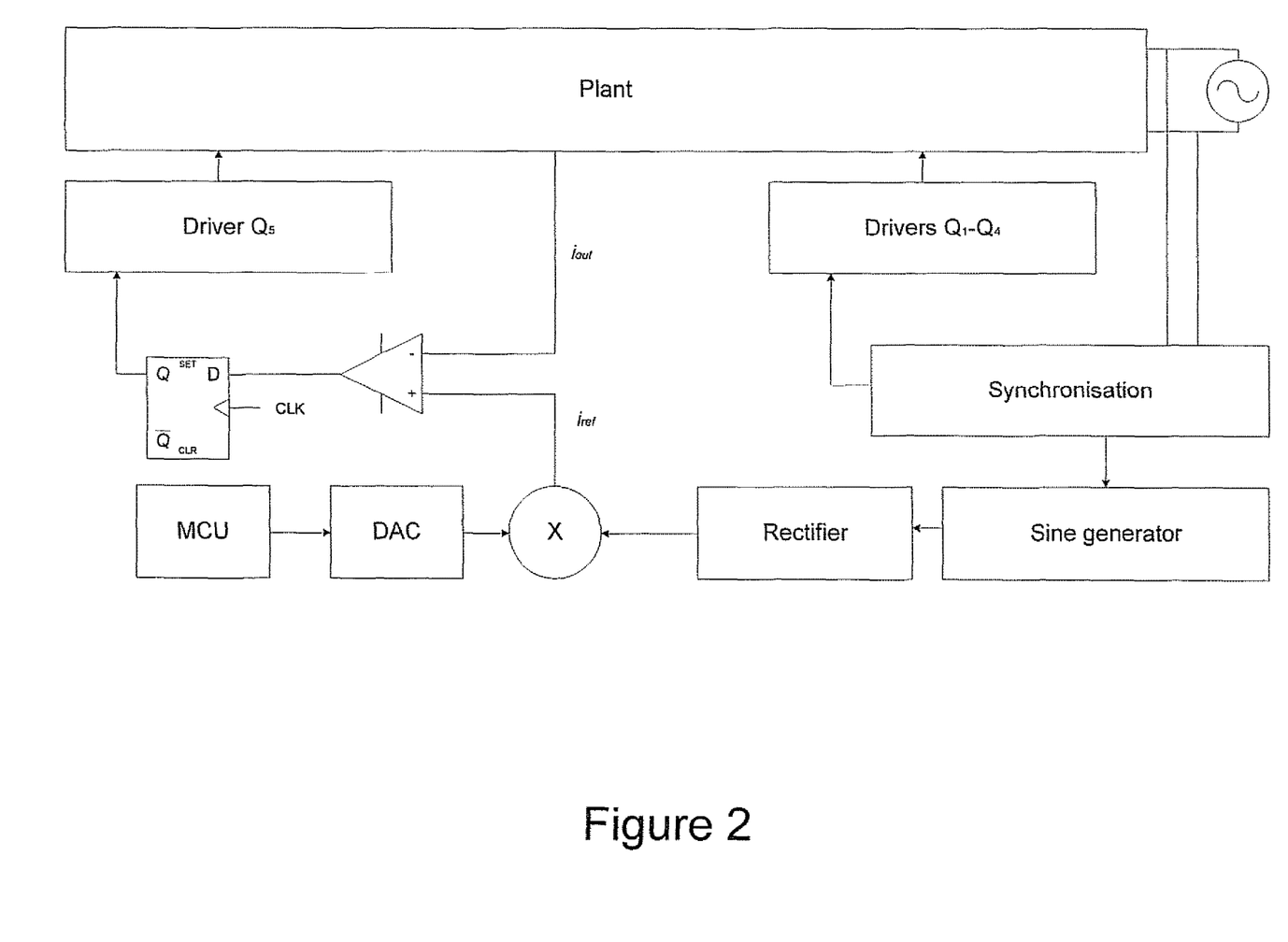
FIG. 2 shows a control block diagram suitable for use with the power conditioning unit of FIG. 1.

The Plant block in FIG. 2. is formed by transistors $Q_1$ to $Q_5$, diodes $D_1$ to $D_6$, inductor $L_{out}$, capacitor $C_{out}$, and the current sensor. A driver is a circuit that provides the right voltage and current levels necessary to turn on or off a specific transistor. The Synchronisation block provides digital signals in synchronism with the grid voltage, i.e. a high level when the grid voltage is positive and a low level otherwise. The Sine generator provides an almost pure sinusoid voltage in synchronism with a signal coming from the Synchronisation block. This can be achieved in various ways. The simplest approach is to sense the voltage from the grid terminals using a high-common mode differential operational amplifier. In this case any distortion in the mains is carried on as distortion in the current waveform. Another way is to use a waveform generator and a phase-lock-loop so that both waveforms are in synchronism. Integrated circuits that accomplish this task normally provide waveforms with a THD between 3 and 5%. A third way is to generate it digitally using a look-up table and a digital to analogue converter. Minimum distortion can be achieved by having a large resolution, e.g. 12 bits, and a fast sampling rate, e.g. 500 KHz.

This sinusoidal voltage is rectified by an additional circuit. Furthermore, the blocks Rectifier and Sine generator can be combined into a single block that performs both actions simultaneously. For example, a look-up table may be used comprising a rectified sinusoid waveform, or the first half of a sinusoid output at twice the frequency of the grid voltage. One additional possibility is to clock the D flip-flop used to buffer the output of the comparator at the same high frequency used to step through the look-up table. This is possible since the output of the comparator is read into the flip-flop at discrete intervals, so the reference current input to the comparator may be updated at the same frequency.

The MCU block contains a microcontroller unit and the DAC block contains a digital to analogue converter circuit. The reference current, $i_{ref}$, is generated by multiplying a constant voltage, from the DAC, by a rectified sinusoidal template, from the Rectifier (or equivalent circuit as described above), in synchronism with the electric grid voltage. The constant voltage coming from the digital to analogue converter (DAC) provides the amplitude of the reference current and therefore the power injection level. This is controlled from the microcontroller unit (MCU). The comparison between the reference current and the sensed current is done through a high speed comparator integrated circuit or operational amplifier.

Figure 3:
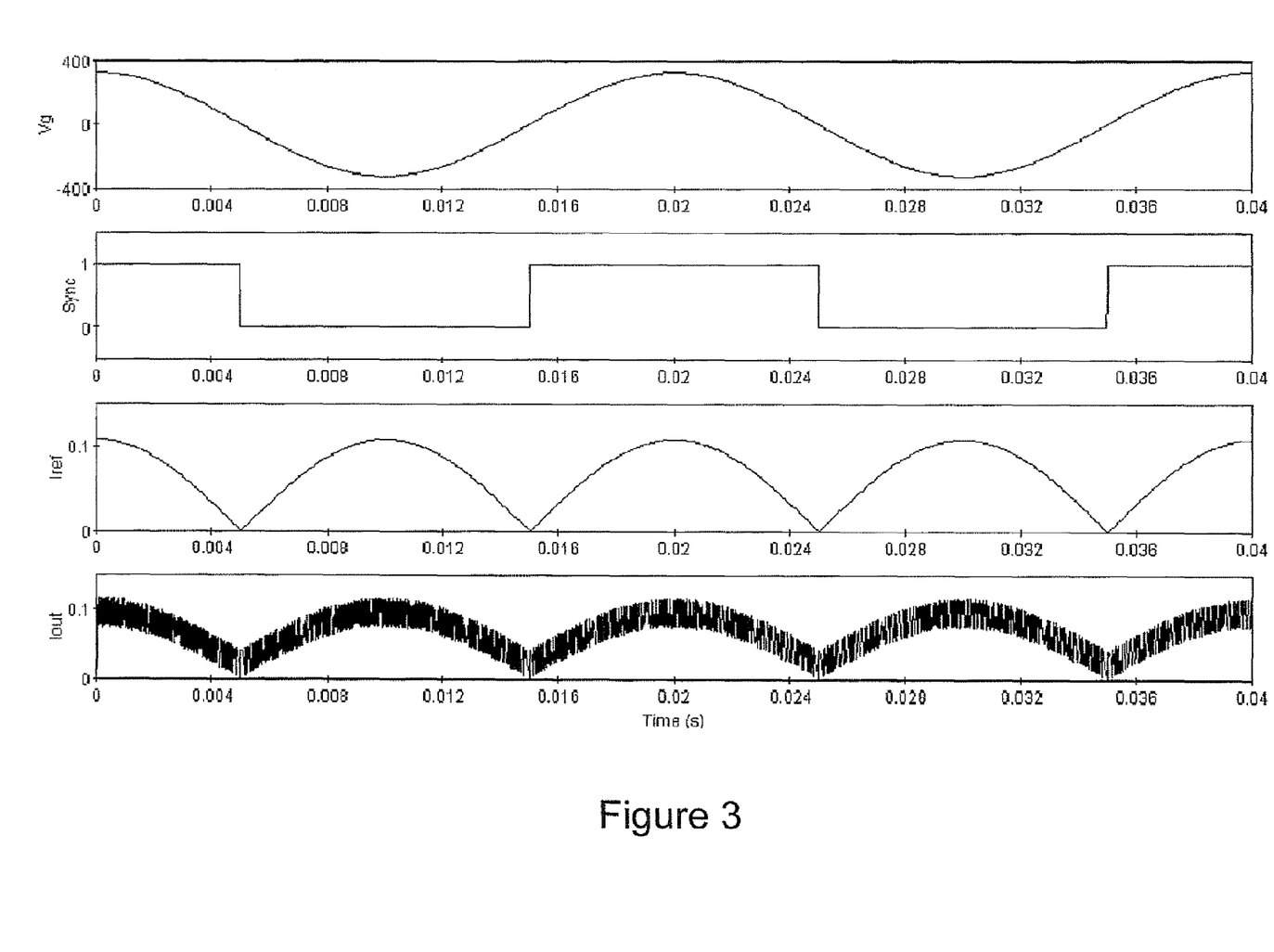
FIG. 3 shows waveforms of the synchronisation block, the reference current, the output current and the grid voltage of FIG. 2.

Waveforms of the synchronisation block, the reference current, the output current and the grid voltage are shown in FIG. 3.

Figure 4:
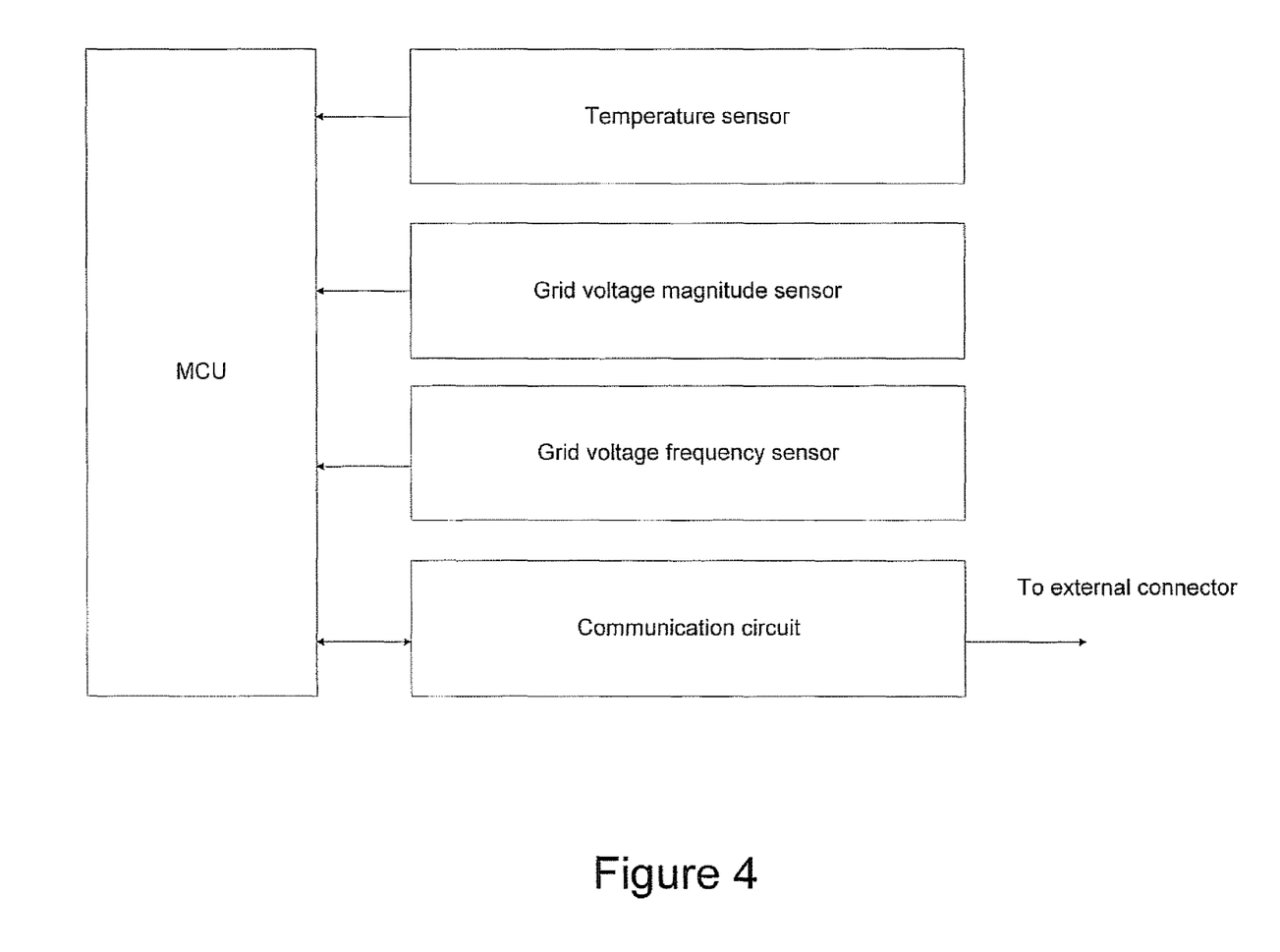
FIG. 4 shows functions of the microcontroller unit of FIG. 2.

In addition, the MCU monitors the temperature of the system, the grid voltage magnitude, the grid voltage frequency, and incorporates communication protocols for external monitoring through a computer. These tasks are depicted in FIG. 4.

The complete system has been tested at 50 watts in the laboratory achieving 87% efficiency and 4.7% total harmonic distortion (THD) in the current.

No doubt many other effective alternatives will occur to the skilled person. It will be understood that the invention is not limited to the described embodiments and encompasses modifications apparent to those skilled in the art lying within the spirit and scope of the claims appended hereto.

The invention claimed is:

1. A photovoltaic power conditioning unit for delivering power from a photovoltaic dc power source to a grid mains utility supply, the power conditioning unit comprising:

a plurality of input terminals for connecting to the dc power source;

a plurality of output terminals for connecting to the grid mains utility supply;

a voltage increasing converter connected to the input terminals;

a voltage reducing converter connected to the voltage increasing converter;

a dc-to-ac converter connected to the voltage reducing converter and to the output terminals and comprising a current source inverter;

a synchronization circuit coupled to the output terminals configured to generate a synchronization signal that is synchronized with the grid mains utility supply;

a reference signal generation circuit that is coupled to the synchronization circuit and configured to generate a sinusoidal reference signal template in synchronism with the grid mains utility supply based on the synchronization signal;

a current sensor configured to sense a current flowing through the voltage reducing converter and to provide a current sense signal; and a comparator configured to compare an instantaneous value of the sinusoidal reference signal template with an instantaneous value of the current sense signal and to provide an output to control the voltage reducing converter to regulate sinusoidal current injection by the current source inverter into the grid mains utility supply.

2. A photovoltaic power conditioning unit according to claim 1, wherein the voltage reducing converter and the dc-to-ac converter share an inductor and wherein the inductor is configured to function as an energy storage inductor in the voltage reducing converter and as a current smoothing inductor in the dc-to-ac converter.

3. A photovoltaic power conditioning unit according to claim 1, wherein the dc-to-ac converter comprises a plurality of transistors and a plurality of protection diodes connected in series with the transistors so that the protection diodes prevent current flow in the reverse direction in the transistors.

4. A photovoltaic power conditioning unit as claimed in claim 1, wherein the voltage increasing converter comprises a dc-to-dc converter, wherein the dc-to-dc converter and the dc-to-ac converter share an inductor and wherein the inductor is configured to function as an energy storage inductor in the dc-to-dc converter and as a current smoothing inductor in the dc-to-ac converter, and wherein the sinusoidal current injection is regulated based on current mode control in the inductor based on buck-type stage of the dc-to-dc converter.

5. A photovoltaic power conditioning unit as claimed in claim 1, the dc-to-ac converter comprising:

a dc connection to the dc photovoltaic power source;

an ac connection to the grid mains utility supply; and a plurality of transistors and a plurality of protection diodes connected in series between the dc connection and the ac connection;

a current control transistor and an inductor connected in series to an input to the dc-to-ac converter to control current injection into the grid mains utility supply;

a first diode connected between a first node between the current control transistor and the inductor and a second node connected to an input of said dc-to-ac converter; and a second diode connected in series with the current control transistor to protect the current control transistor by inhibiting current from flowing back through the current control transistor when the current control transistor is switched off.

6. A power conditioning unit according to claim 5, wherein the dc connection comprises two dc connection terminals, the ac connection comprises two ac connection terminals, a first transistor and a first protection diode being connected in series between the first dc connection terminal and the first ac connection terminal, a second transistor and a second protection diode being connected in series between the first dc connection terminal and the second ac connection terminal, a third transistor and a third protection diode being connected in series between the second dc connection terminal and the first ac connection terminal and a fourth transistor and a fourth protection diode being connected between the second dc connection terminal and the second ac connection terminal.

7. A power conditioning unit as claimed in claim 1, further comprising a buffer coupled between the comparator and the voltage reducing converter to buffer an output of the comparator.

8. A power conditioning unit as claimed in claim 7, wherein the buffer operates at a greater frequency than a frequency of the grid mains utility supply.

9. A power conditioning unit as claimed in claim 1, wherein the reference signal generation circuit comprises:
   a digital-to-analogue converter configured to provide an amplitude control signal; and
   a circuit configured to control an amplitude of the rectified sinusoidal signal template in response to the amplitude control signal.

10. A method of controlling a photovoltaic power conditioning unit, the photovoltaic power conditioning unit comprising a plurality of input terminals for connecting to a dc power source, a voltage increasing converter connected to the input terminals, a voltage reducing converter connected to the voltage increasing converter, a dc-to-ac converter connected to the voltage reducing converter and a plurality of output terminals for connecting to a grid mains utility supply, the output terminals being connected to the dc-to-ac converter, the method comprising:
   sensing a voltage on the output terminals;
   generating a reference current responsive to said sensing;
   sensing a supply current in the dc-to-ac converter;
   controlling the voltage reducing converter responsive to a difference between the reference current and the supply current;
   using the dc-to-ac converter as a current source inverter to control power injected into the grid mains utility supply;
   generating a sinusoidal reference signal template in synchronism with the grid mains utility supply;
   comparing an instantaneous value of the sinusoidal reference signal with an instantaneous value of the sensed supply current; and
   regulating sinusoidal current injection by the current source inverter into the grid mains utility supply by controlling the voltage reducing converter in response to the comparison of the instantaneous value of the sinusoidal reference signal with the instantaneous value of the sensed supply current.

11. A method as claimed in claim 10, wherein generating the sinusoidal reference signal comprises generating a full wave rectified sinusoidal reference signal template.

12. A method as claimed in claim 11 wherein said voltage reducing converter incorporates a power control switch and said controlling comprises turning the switch off if the supply current is greater than the reference current and turning the switch on if the supply current is less than the reference current, and wherein the switch is controlled in synchronism with the sinusoidal reference signal template.

13. A method as claimed in claim 10 wherein said voltage reducing converter incorporates a power control switch and said controlling comprises turning the switch off if the supply current is greater than the reference current and turning the switch on if the supply current is less than the reference current.

14. A photovoltaic power conditioning unit for delivering power from a photovoltaic dc power source to a grid mains utility supply, the power conditioning unit comprising:
   a plurality of input terminals for connecting to the photovoltaic dc power source;
   a plurality of output terminals for connecting to the grid mains utility supply;
   a voltage increasing converter connected to the input terminals;
   a voltage reducing converter connected to the voltage increasing converter, the voltage reducing converter comprising a current control transistor and an inductor connected in series with an input to a dc-to-ac converter;
   the dc-to-ac converter connected to the output terminals and comprising an input connected in series with the inductor of the voltage reducing converter;
   a voltage sensor for sensing a voltage on the output terminals;
   a reference current generator for generating a reference current $i_{ref}$ responsive to the sensing;
   a current sensor for sensing a supply current $i_{out}$ in the dc-to-ac converter; and
   a comparator for controlling the voltage reducing convertor and switching of the transistor responsive to a difference between the reference current and the sensed supply current, such that the transistor is turned off in response to the reference current $i_{ref}$ being greater than the supply current $i_{out}$ and such that the transistor is turned on if the reference current $i_{ref}$ is less than the supply current $i_{out}$, and wherein current through the inductor follows a rectified sinusoid which is unfolded by the dc-to-ac converter to provide a sinusoidal current synchronously injected into the grid mains utility supply.

15. A method of controlling a photovoltaic power conditioning unit, the power conditioning unit comprising a plurality of input terminals for connecting to a photovoltaic dc power source, a voltage increasing converter connected to the input terminals, a voltage reducing converter connected to the voltage increasing converter, a dc-to-ac converter connected to the voltage reducing converter, a plurality of output terminals for connecting to a grid mains utility supply with the output terminals being connected to the dc-to-ac converter, a voltage sensor for sensing a voltage on the output terminals, a reference current generator for generating a reference current $i_{ref}$ responsive to the sensing, a current sensor for sensing a supply current $i_{out}$ in the dc-to-ac converter, a current control transistor and an inductor connected in series with an input to the dc-to-ac converter, and a comparator for controlling the voltage reducing converter and switching of the current control transistor responsive to a difference between the reference current and the supply current, the method comprising:
   sensing a voltage on the output terminals;
   generating a reference current responsive to the sensing of the voltage,
   sensing a supply current in the dc-to-ac converter;
   controlling the voltage reducing converter responsive to a difference between the reference current and the supply current;

switching the current control transistor responsive to the difference between the reference current and the supply current such that if the reference current $i_{ref} > i_{out}$ the transistor is turned on and if the reference current $i_{ref} \leq i_{out}$ the transistor is turned off;

controlling power injected into the grid mains utility supply such that current through the inductor follows a rectified sinusoid;

unfolding the rectified sinusoidal current through the inductor using the dc-to-ac converter to provide a sinusoidal current; and synchronously injecting the sinusoidal current into the grid mains utility supply.

\* \* \* \* \*